United States Patent Office 2,819,955
Patented Jan. 14, 1958

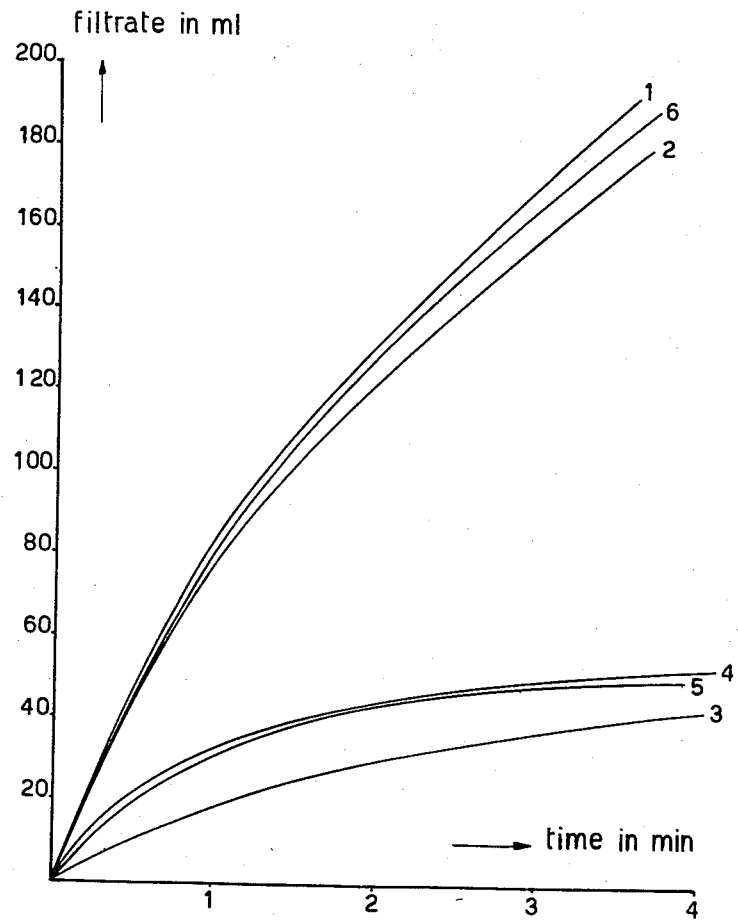

---

2,819,955

TREATMENT OF IMPURE CALCIUM NITRATE

Willem Slot, Geleen, Netherlands, assignor to Stamicarbon N. V., Heerlen, Netherlands Application February 16, 1953, Serial No. 337,160

Claims priority, application Netherlands February 28, 1952

2 Claims. (Cl. 71—58)

The invention relates to the treatment of impure calcium nitrate and, more particularly it is concerned with the neutralization of acidic impurities contained in calcium nitrate crystals obtained in the manufacture of phosphate fertilizers by acid decomposition of raw phosphate materials with nitric acid in the manner described in the U. S. P. 1,816,285.

Field of the invention

The economical and efficient transformation of naturally occurring raw phosphate materials into a form which may be assimilated by plant life is a major problem. One of the principal methods for accomplishing this transformation is to treat the raw phosphate material with substantial quantities of strong mineral acids such as nitric or sulfuric acids.

In those cases where the acid treatment involves the use of nitric acid calcium nitrate is obtained as a byproduct and may be crystallized and separated from the acid decomposition liquors resulting in the process, which liquors whereupon are neutralized, concentrated and converted into phosphate containing fertilizers. However, the separated calcium nitrate crystals of the formula $Ca(NO_3)_2 \cdot 4H_2O$ invariably occlude or entrain portions of the acidic phosphate ions containing mother liquor.

As a result, in the latter stages of the process of converting the calcium nitrate crystals into a commercial calcium nitrate fertilizer product in which process the crystals are subjected to melting and concentrating treatments nitrous fumes are expelled and nitrogen losses and corrosion of the apparatus occurred because of the presence of the acidic phosphate ions containing liquor occluded from the mother liquors.

Several methods have been suggested for overcoming the disadvantages of the presence of the acidic material in the calcium nitrate as described above.

Thus it is proposed to neutralize the contaminated crystals or a solution or melt of the crystals with pulverized calcium carbonate, calcium oxide or calcium hydroxide. When applying this method it was found to be impossible to remove the acidic material with an equivalent amount of a calcium compound because the calcareous particles get coated with a thin layer of insoluble calcium phosphate which prevents the progress of the neutralizing reaction.

This always necessitated the use of a fairly large excess of neutralizer producing a big amount of precipitate so that much filter work has to be done when this precipitate is separated from the neutralized calcium nitrate solution or melt.

According to the U. S. P. 2,524,174 these objections are obviated by lowering the acidity of the contaminated crystals with calcium oxide or calcium hydroxide, dissolved in a calcium nitrate solution containing little or no phosphate ions. However, this method has the drawback that in each treatment a relatively large volume of calcium nitrate solution is needed for dissolving the calcium oxide or hydroxide.

Further it has been proposed to neutralize a melt or solution of the contaminated crystals with ammonia, but it appeared that the use of ammonia for lowering the acidity mostly led to the formation of a gelatinous calcium phosphate precipitate which was difficult to filter.

It has now been found that if ammonia is used for lowering the acidity of acid phosphatic solutions or melts of calcium nitrate a very easily filterable precipitate can be formed if certain conditions are observed.

Objects

A principal object of this invention is the provision of a new method for the neutralization with ammonia of calcium nitrate solutions or molten masses which have an acid reaction and contain phosphates i. e. are contaminated with phosphoric acid or acid phosphates. A further object is to simplify the manufacturing of a commercial nitrogen fertilizer product starting from calcium nitrate crystals obtained as byproduct by converting raw phosphate material with nitric acid into phosphate fertilizers.

Still further objects and the entire scope of applicability of the present invention will become apparent from the description given herein.

Description

Briefly stated the objects outlined above are realized in accordance with the present invention by carrying out the neutralizing process with ammonia of the acid phosphatic solutions or molten masses in such a manner that:

(1) The neutralizing process is to be carried out as a continuous operation (2) The pH value of the liquid mass into which the ammonia is introduced is to be kept at a value not less than 4 or greater than 5.

According to the present invention a process for lowering the acidity of acid phosphatic solutions or melts of calcium nitrate with ammonia for the purpose above described comprises supplying a current of the acid liquor and a current of the ammonia simultaneously and continuously to a reservoir provided with an overflow and adjusting the ratio of the two currents so that the pH value of the liquor into which the ammonia is being introduced is maintained at a value not less than 4 or greater than 5, the overflowing liquid mixture after filtration being converted into a solid calcium nitrate fertilizer.

As compared with the process most commonly used hitherto in which marl ($CaCO_3$) or lime is used as a neutralizer, the process according to the invention has the following advantages:

(1) The amount of precipitate formed is only small because in the process according to the invention no excess of neutralizer is used as is the case in the use of marl or lime; as a result of the smaller amount of precipitate forming the filter presses are less severely loaded so that they may be cleaned at longer intervals;

(2) The resulting filter cake has a high content of $P_2O_5$, and therefore may without any inconvenience be added to a fresh amount of phosphate rock which is to be decomposed with the help of nitric acid;

(3) During the neutralization no inconvenient froth formation occurs.

The fact that the precipitate obtained by carrying out the process of lowering the acidity of the acid calcium nitrate solutions or melts under the above conditions, can be filtered with greater ease is clearly shown by the accompanying drawing which is a graph in which the measured number of cc. of filtrate obtained in six filtrations has been plotted against the filtering period. The process of lowering the acidity, preceding the filtration was carried out under varying conditions; these conditions are summarized in the following table. In the case of tests 1 and 2 tabulated below, the pH fluctuated between 4 and 5. Similarly, in the case of test 3, the pH during the treatment with NH$_3$ fluctuated between 6 and 7. In case of test 4, the pH during the treatment fluctuated between 2 and 7. In these tests, which comprehended the continuous neutralizing treatment described earlier in this specification, the final pH of the liquor withdrawn through an overflow fluctuated between the stated limits.

TABLE

| Filter test | Process of lowering the acidity | pH | |
|---|---|---|---|
| 1 | Continuous with NH$_3$. | 4-5 | |
| 2 | ___do___ | 4-5 | Neutralization proceeds 4 times as rapidly as in test 1. |
| 3 | ___do___ | 6-7 | |
| 4 | ___do___ | 2-7 | In this process of lowering the acidity, the pH of the reservoir was not kept constant owing to the varying supply of NH$_3$. |
| 5 | Discontinuous with NH$_3$. | Final value=5. | |
| 6 | Discontinuous with marl. | ___do___ | |

By a discontinuous neutralization process or a discontinuous process of lowering the acidity is meant the process, by which so much neutralizer is supplied to a reservoir filled with acid liquor as is needed for attaining the final pH value desired.

The process of lowering the acidity and the filtration were carried out at a temperature of 85° C.; it is also possible, however, to operate at lower or higher temperatures; by preference the operating temperature should not be below 60° C. as otherwise the concentrated calcium nitrate solutions will become too viscous.

According to the invention neutralized and filtered calcium nitrate solution is subsequently concentrated by evaporation till the nitrogen percentage of the melt amounts to at least 15.5% whereupon the melt is in the known way converted into a solid fertilizer product by flaking or prilling.

*Summary*

As will be appreciated from the foregoing the present invention provides a new and highly advantageous method for lowering the acidity of impure calcium nitrate crystals.

The manufacturing of a nitrogen fertilizer from these impure calcium nitrate crystals is simplified because less filter work has to be done, therefore the manufacturing of a nitrogen fertilizer can be done in a much more economical way than hitherto possible.

Having described my invention, what I claim is:

1. A continuous process for converting impure calcium nitrate-tetrahydrate crystals having an acidic reaction and containing acid phosphorus-containing ions into solid calcium nitrate fertilizer, consisting essentially of the following steps: forming an acidic calcium nitrate-containing liquor from said calcium nitrate-tetrahydrate crystals; reducing the acidity of said liquor in a single stage by introducing a stream of said liquor and a stream of ammonia simultaneously and continuously into a reaction zone provided with an overflow and maintained at a temperature above about 60° C.; adjusting the relative amounts of acidic liquor and ammonia supplied to the reaction zone to maintain the pH value of the liquor between 4 and 5, whereby any precipitate formed in the reaction zone is relatively small in amount and readily filterable; treating the overflow reaction products to remove the precipitate therefrom, and concentrating the remaining solution into a solid calcium nitrate-containing fertilizer product.

2. A continuous process for reducing in a single stage the acidity of a nitric acid-calcium nitrate composition in dissolved form containing phosphate ions to produce a fertilizer product, consisting essentially of the following steps: feeding continuously and simultaneously a stream of the calcium nitrate acid solution and a stream of ammonia into a reaction zone; adjusting the relative amount of the supplied solution and ammonia so as to reduce the acidity of the liquid in said reaction zone and maintain the pH therein between 4 and 5; maintaining the liquid in the reaction zone at a temperature above about 60° C., whereby any precipitate formed therein is relatively small in amount and readily filterable; continuously removing a stream of the reaction products from the reaction zone, and filtering the stream so removed to separate a calcium nitrate-containing fertilizer product.

References Cited in the file of this patent
UNITED STATES PATENTS

| | | |
|---|---|---|
| 1,849,703 | Boller | Mar. 15, 1932 |
| 1,854,291 | Burdick | Apr. 19, 1932 |
| 1,856,187 | Johnson | May 3, 1932 |
| 1,876,501 | Johnson | Sept. 6, 1932 |
| 1,894,767 | Harvey | Jan. 17, 1933 |
| 1,902,652 | Liljenroth | Mar. 21, 1933 |
| 1,924,041 | Johnson | Aug. 22, 1933 |
| 1,999,026 | Tramm et al. | Apr. 23, 1935 |
| 2,524,174 | Plusje et al. | Oct. 3, 1950 |
| 2,573,516 | Van Der Molen | Oct. 30, 1951 |
| 2,646,266 | Calmeyer | Oct. 20, 1953 |
| 2,701,193 | Heudier et al. | Feb. 1, 1955 |
| 2,726,949 | Andres et al. | Dec. 13, 1955 |